(12) United States Patent
Park et al.

(10) Patent No.: US 7,450,132 B2
(45) Date of Patent: Nov. 11, 2008

(54) METHOD AND/OR APPARATUS FOR HIGH SPEED VISUALIZATION OF DEPTH IMAGE-BASED 3D GRAPHIC DATA

(75) Inventors: Inkyu Park, Seoul (KR); Gyeongja Jang, Yongin-si (KR); Jooyeon Han, Seoul (KR); Seokyoon Jung, Seoul (KR); Keunho Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 158 days.

(21) Appl. No.: 11/052,135

(22) Filed: Feb. 8, 2005

(65) Prior Publication Data
US 2005/0174346 A1    Aug. 11, 2005

(30) Foreign Application Priority Data
Feb. 10, 2004    (KR) .................... 10-2004-0008741

(51) Int. Cl.
G06T 15/00    (2006.01)
(52) U.S. Cl. ....................... 345/582; 345/422
(58) Field of Classification Search .................. None
See application file for complete search history.

(56) References Cited

U.S. PATENT DOCUMENTS

| | | | | |
|---|---|---|---|---|
| 5,409,379 A | * | 4/1995 | Montag et al. ............... 434/2 |
| 5,684,935 A | * | 11/1997 | Demesa et al. ............. 345/419 |
| 6,424,351 B1 | * | 7/2002 | Bishop et al. .............. 345/582 |
| 6,466,207 B1 | * | 10/2002 | Gortler et al. ............. 345/427 |
| 6,727,908 B1 | * | 4/2004 | Wright et al. ............. 345/606 |
| 6,756,993 B2 | * | 6/2004 | Popescu et al. ............ 345/646 |
| 6,954,202 B2 | * | 10/2005 | Han et al. .................. 345/419 |
| 6,975,756 B1 | * | 12/2005 | Slabaugh et al. .......... 382/154 |
| 6,999,073 B1 | * | 2/2006 | Zwern et al. .............. 345/420 |
| 7,015,914 B1 | * | 3/2006 | Bastos et al. ............. 345/506 |
| 7,215,340 B2 | * | 5/2007 | Pfister et al. ............. 345/582 |
| 2002/0050991 A1 | * | 5/2002 | Fujita et al. ............... 345/422 |

OTHER PUBLICATIONS

McMillan, Jr., "An Image Based Approach to Three-Dimensional Computer Graphics," 1997, pp. 44-49.*
Foley et al., "Computer Graphics: Principles and Practice," 1990, pp. 660-663.*
Bayakovski et al;. "Depth Image-based representations for static and animated objects," ICIP 2002, IEEE Sep. 22, 2002, pp. 25-28.

(Continued)

*Primary Examiner*—Kee M Tung
*Assistant Examiner*—Andrew Yang
(74) *Attorney, Agent, or Firm*—Staas & Halsey LLP

(57) ABSTRACT

A method and/or apparatus for high speed visualization of depth image-based 3D graphic data. The method includes: reading point texture data of a 3D object; performing a 3D warping for each of the reference images of the simple texture data at a predetermined view point to obtain warped images; performing a depth test and a splatting for each pixel of the plurality of warped images to obtain final color data; and visualizing an object by using the final color data. Accordingly, it is possible to reduce memory usage and increase the number of visualization per a second and to effectively implement visualization of 3D graphic object in, particularly, a mobile terminal.

36 Claims, 13 Drawing Sheets

OTHER PUBLICATIONS

Shade, J. et al. "Layered Depth Images" Computer Graphics, Jul. 1998 pp. 231-242.

Oliveira M. et al. "Relief Texture Mapping" Computer Graphics Proceeding, NY, ACM, Jul. 23, 2000 pp. 359-368.

Jang et al. "Depth Image-Based Rendering of 3-D Object on Mobile Device" ISPACS 2004, IEEE Nov. 18, 2004, pp. 630-633.

Levkovich-Maslyuk et al. "Depth Image-Based Representation and Compression for Static and Animated 3-D Objects" IEEE Transactions on Circuits and Systems for Video Technology, vol. 14, No. 7, Jul. 2004, pp. 1032-1045.

L. McMillan Jr., PhD. "An image-based approach to three-dimensional computer graphics," University of North Carolina at Chapel Hill, 1997.

Chinese Office Action issued Mar. 21, 2008 in corresponding Chinese Patent Application No. 2005100061171.

* cited by examiner

- E(EPIPOLAR POINT): A POSITION OF $C_{new}$ AT A REFERENCE VIEW
- $C_{new}$: A CENTER OF A NEW (CAMERA) VIEW

FIG. 22

|  | DATA TYPE | NUMBER OF POINTS | SPLAT SIZE | AVERAGE VISUALIZATION SPEED (FIELD PER SECOND: FPS) | POINT PROCESSING SPEED PER SECOND (POINT PER SECOND: PPS) |
|---|---|---|---|---|---|
| BOO | SIMPLE TEXTURE | 35,736 | 1 | 7.96 | 284,459 |
|  |  |  | 2 | 6.76 | 241.575 |
|  |  |  | 3 | 4.81 | 170,890 |
|  |  |  | 4 | 3.81 | 136.154 |
| DOG | SIMPLE TEXTURE | 50,070 | 1 | 8.20 | 410,574 |
|  |  |  | 2 | 6.14 | 307,430 |
|  |  |  | 3 | 4.32 | 216,302 |
|  |  |  | 4 | 3.42 | 171,239 |
| AVATAR | SIMPLE TEXTURE | 23,736 | 1 | 9.45 | 224,305 |
|  |  |  | 2 | 8.51 | 201,993 |
|  |  |  | 3 | 6.68 | 158,557 |
|  |  |  | 4 | 5.34 | 126,750 |
| FLOWER | SIMPLE TEXTURE | 30,246 | 1 | 5.34 | 161,514 |
|  |  |  | 2 | 4.41 | 133,385 |
|  |  |  | 3 | 3.32 | 100,417 |
|  |  |  | 4 | 2.75 | 83,177 |

FIG. 23

|  | DATA TYPE | NUMBER OF POINTS | SPLAT SIZE | AVERAGE VISUALIZATION SPEED (FIELD PER SECOND: FPS) | POINT PROCESSING SPEED PER SECOND (POINT PER SECOND: PPS) |
|---|---|---|---|---|---|
| FLOWER | POINT TEXTURE | 32,933 | 1 | 13.09 | 431,092 |
|  |  |  | 2 | 12.18 | 401,124 |
|  |  |  | 3 | 9.38 | 308,912 |
|  |  |  | 4 | 7.67 | 252,596 |
| ANGEL | OCTREE IMAGE | 120,183 | 1 | 4.69 | 563.658 |
|  |  |  | 2 | 4.46 | 536,016 |
|  |  |  | 3 | 4.22 | 507,172 |
|  |  |  | 4 | 3.33 | 400,209 |

METHOD AND/OR APPARATUS FOR HIGH SPEED VISUALIZATION OF DEPTH IMAGE-BASED 3D GRAPHIC DATA

CROSS-REFERENCE TO RELATED APPLICATION

This application claims the benefit of Korean Patent Application No. 10-2004-0008741, filed on Feb. 10, 2004, in the Korean Intellectual Property Office, the disclosure of which is incorporated herein in its entirety by reference.

BACKGROUND OF THE INVENTION

1. Field of the Invention

The present invention relates to a three-dimensional (3D) graphics, and more particularly, to a method for and/or an apparatus for high-speed visualization of a depth image-based 3D graphic data.

2. Description of the Related Art

Initially, the ultimate goal of 3D graphics is to synthesize realistic graphic images with equal realism compared with the real world. Conventionally, a polygonal mesh is widely used in 3D computer graphics to represent a 3D object, with which any arbitrary shape of object can be modeled properly. Due to the advances in a graphics algorithm and a graphics processing unit (GPU), even very complex objects or scenes can be rendered in real-time.

Recently, mobile devices such as a cellular phone and a personal digital assistant (PDA) have become very popular. In addition, attempts are made to provide a multimedia services, such as graphics animation, moving pictures, music, and games. Furthermore, there have been attempts to show 3D graphics objects on the mobile devices in such applications.

However, unlike typical personal computers, there have been severe problems in attempting to apply 3D graphics to a mobile device. First, the CPUs usually don't have enough processing power. Second, the mobile CPUs do not support floating-point arithmetic operations. Third, the mobile CPUs also don't have hardware 3D graphics accelerators either. For these reasons, it is very difficult to render 3D object at an interactive frame rate on mobile devices.

On the other hand, efficient methods for representing and visualizing a 3D object without use of explicit mesh representation have recently been introduced. One such method is called depth image-based representation (DIBR), which has been adopted as an international standard in MPEG-4 animation framework extension (AFX), as detailed in "Coding of Audio-Visual Objects: Animation Framework Extension (AFX)", ISO/IEC JTC1/SC29/WG11 14496-16. It is similar to the relief texture discussed in "Relief textures mapping," Proc. SIGGRAPH '00, pp. 359-368, July 2000. However, DIBR is more intuitive and has better structure for fast rendering using 3D warping.

In the DIBR method, the present inventors proposed a fast rendering algorithm of Simple Texture format of DIBR, which is a set of reference images covering visible surfaces of the 3D object, discussed in "Depth image-based representations for static and animated 3D objects," Proc. IEEE International Conference on Image Processing, vol. III, pp. 25-28, Rochester, USA, September 2002. Here, each reference image consists of a texture (color) image and a corresponding depth image, in which each pixel value denotes the distances from the image plane to the surface of the object. A depth image-based model (DIBM) has advantages in that the reference image can provide high quality visualization for an object without directly using the aforementioned complex polygonal meshes. Furthermore, the rendering complexity for synthesizing a new scene is proportional to the number of pixels, not to the complexity of the scene. This feature is useful in rendering on mobile devices that usually have low display resolution. According to the DIBM, a 3D object is represented by texture and depth images, observed by N cameras where N is an arbitrary integer. An example of the DIBR is shown in FIG. 1.

A point texture and an octree image are different formats of the DIBR family. In the point texture, an object is represented by an array of pixels observed at one camera position as shown in FIG. 2. Each point texture pixel is represented by a color, a depth corresponding to a distance from a pixel to the camera, and several properties contributing to the point texture visualization. There may be a plurality of pixels in each intersection between each line of sight and an object. Therefore, the point texture is typically organized with multiple layers. In the octree image, an object is represented by using an octree, as shown in FIGS. 3A and 3B, with images on each side being used as reference images.

Another method has been introduced, where a warping algorithm is capable of producing a visualized view from a new view point without accomplishing a depth test, (hereinafter referred to as the McMillan method) discussed in "*An image-based approach to three-dimensional computer graphics,*" L. McMillan, PhD Dissertation, University of North Carolina at Chapel Hill, 1997. Now, the McMillan's method will be described in more detail. As shown in FIG. 4, a world coordinate system is organized according to geometric information of the reference images. For example, a point P1 on the reference coordinate system is transformed into a point P2 on the world coordinate system. From the new view point, the point P2 is viewed as a point P3. The point P3 is obtained by applying a transformation matrix T to the point P1. In order to align points of the reference image on a new view point, an epipolar point is searched. The epipolar point corresponds to a center of a new view (that is, a center of a new camera view) projected to the reference image. Moreover, to which of nine regions, shown in FIG. 5, the epipolar point is projected is identified, and then a splatting order of the pixels on the reference image is determined according to a sign on a z-axis. If a sequential visualization is performed such that pixels are projected one by one to a new view along rows and columns of a grid array according to the order determined as described above, the depth test becomes unnecessary because the latest mapped pixel always occupies the closest point.

Meanwhile, a further attempt to expand the concept of the depth image has been suggested, with a layered depth image method, in which multiple pixels correspond to one pixel position. This method is disclosed in "Layered depth images", *Proc. of SIGGRAPH '98*, pp. 231-242, July 1998. In a simple depth image, distortion occurs in an object surface where data do not exist while a view point changes. On the contrary, in the layered depth image, such distortion does not occur because even an invisible back surface of an object has 3D coordinate information and composes the layered depth image. The visualization method of the layered depth image is nearly similar to the McMillan algorithm. Specifically, a direction and an order of drawing pixels in a new image is determined according to the position of the epipolar point on the reference image of the new view and a sign on a z-axis as shown in FIG. 5. According to this method, a back-to-front visualization can be always obtained without the depth test.

On the other hand, in the fields of portable apparatuses, there has not been sufficient research in such high-speed visualization of a 3D graphic object by using the image-based representation.

SUMMARY OF THE INVENTION

Embodiments of the present invention provide a method and an apparatus for high speed visualization of depth image-based three-dimensional (3D) graphic data represented by one of a simple texture, a point texture, and an octree image to reduce memory usage and increase a visualization speed.

Additional aspects and/or advantages of the invention will be set forth in part in the description which follows and, in part, will be obvious from the description, or may be learned by practice of the invention.

According to an aspect of the present invention, embodiments of the present invention provide a method of high speed visualization of depth image-based three-dimensional (3D) graphics data, the method including: allocating memory to simple texture data having a plurality of reference images; obtaining a plurality of warped images by performing a 3D warping of each of the reference images of the simple texture data at a predetermined view point; obtaining depth data and color data by performing a depth test of each pixel composing the plurality of warped images; and visualizing an object by using the depth data and the color data.

In operation of the allocating memory to simple texture data, background data outside a minimum size of square including the object in the reference images may be removed and the minimum size of square including the object may include depth and color data.

The 3D warping may be performed for only the reference image of which a normal vector has an angle below a predetermined level with respect to a predetermined view vector among a plurality of reference images consisting of the simple texture data. Above 3D warping may include: searching an epipolar point by projecting a center of an eye coordinate system at a novel view point to the reference image of the simple texture data; determining a warping order for the pixels of the reference images according to which of nine regions defined in the reference image corresponds to a region to which the epipolar point is projected; obtaining the warped image by transforming each coordinate value of a reference coordinate system in which a simple texture has been defined according to the warping order to an eye coordinate system; and iterating from searching an epipolar point to obtain the warped image with respect to the reference images of the simple texture data.

The coordinate transformation may be accomplished by fixed-point arithmetic operation of a floating-point arithmetic operation. The fixed-point arithmetic operation may include: converting the floating-point number to the corresponding fixed-point number; performing a coordinate transformation using the converted fixed-point number; and converting the result of the coordinate transformation to a floating-point representation. The performing a depth test may include: storing depth and color values, obtained by the warping operation for the first reference image, in a front depth buffer and a front color buffer, respectively; storing depth and color values, obtained by the warping operation for the second reference image, in a back depth buffer and a back color buffer, respectively; comparing the depth value stored in the front depth buffer with the depth value stored in the back depth buffer; substituting the depth value stored in the front depth buffer and the color value stored in the front color buffer with the depth value stored in the back depth buffer and the color value stored in the back color buffer, respectively, if the depth value stored in the front depth buffer is larger than the depth value stored in the back depth buffer as a result of the comparison; and iterating from the storing the depth and color values through the substituting the depth and color values with respect to all warping images. The operation of performing the depth test may further include adaptively controlling a splat size depending on a distance from a predetermined view point to a 3D object and the operation of visualizing the object is accomplished by using the depth data, the color data, and the appropriately sized splat. The operation of adaptively controlling the splat size includes: determining an initial splat size by comparing a resolution of the reference image with a resolution of a destination image; and adjusting the initial splat size according to an enlargement/reduction ratio of a zoom-in/zoom-out operation to create the destination image. In the operation of determining the initial splat size, the splat size may be set to 1 if the resolution of the destination image is smaller than or equal to the resolution of the reference image, and the splat size may be set to an average enlargement aspect ratio if the resolution of the destination image is larger than the resolution of the reference image. In the operation of adjusting the initial splat size, the splat size may be enlarged by a zoom ratio so as to prevent a "hole" phenomenon during the zoom-in, and reduced by the zoom ratio so as to retain visualization quality of a predetermined level during the zoom-out.

According to another aspect of the present invention, there is provided the method of the high speed visualization of depth image-based 3D graphic data, the method including: initializing point texture data of a 3D object; determining a warping order for reference images of the point texture at a predetermined view point according to the position of an epipolar point and a sign of a depth coordinate value; and visualizing the 3D object by using the warping order.

The operation of reading the 3D object may be applied to a method of high speed visualization of the point texture by transforming 3D object data represented by an octree structure to the point texture data and reading the transformed 3D object data. The operation of reading the 3D object may include: decoding the 3D object data represented by an octree structure; projecting voxels of the octree on a predetermined pixel position of a reference surface in a normal direction with respect to the reference surface corresponding to a predetermined surface of a hexahedron including the decoded octree; defining the distance from the voxels to a pixel corresponding to the voxel projected on the reference surface as a depth value; and defining colors of the voxels as color values. The operation of determining a warping order for reference images of the point texture may be performed after each coordinate value of the reference coordinate system in which the point texture has been defined is transformed to the eye coordinate system when a view point is changed. The coordinate system transformation may be accomplished by fixed-point arithmetic operation of a floating-point arithmetic operation. The 3D object may be visualized by using the warping order and the adaptively controlled splat size.

The operation of adaptively controlling the splat size may include: determining an initial splat size by comparing a resolution of the reference image with a resolution of a destination image; and modifying the initial splat size according to an enlargement/reduction ratio of a zoom-in/zoom-out operation to create the destination image.

According to still another aspect of the present invention, there is provided an apparatus for high speed visualization of depth image-based 3D graphic data, the apparatus including: a simple texture data memory allocation unit allocating memory to simple texture data having a plurality of reference images; a warping unit performing a 3D warping for each of the reference images of the simple texture of the simple texture data memory allocation unit at a predetermined view point; a depth test unit performing a depth test for each pixel of the plurality of warping images to obtain depth data and color data; and a visualization unit visualizing a 3D object by using the depth data and the color data. The warping unit may include: an epipolar transformation unit searching an epipolar point by projecting a center of an eye coordinate system at a predetermined view point on the reference images of the simple texture data; a warping order determining unit determining a warping order for the pixels of the reference images according to which of nine regions defined in the reference images corresponds to a region which the epipolar point is projected to; and a pixel warping unit transforming each coordinate value of a reference coordinate system, in which the simple texture has been defined according to the warping order, to an eye coordinate system to obtain the warped images. The depth test unit may include: a front depth buffer storing a depth value created by the warping for a first reference image; a front color buffer storing a color value created by the operation of warping for the first reference image; a back depth buffer storing a depth value created by the operation of warping for the second reference image; a back color buffer storing a color value created by the warping for a second reference image; a depth comparison unit comparing the depth value stored in the front depth buffer with the depth value stored in the back depth buffer; and an update unit substituting the depth value stored in the front depth buffer and the color value stored in the front color buffer with the depth value stored in the back depth buffer and the color value stored in the back color buffer, respectively, if the depth value stored in the front depth buffer is larger than the depth value stored in the back depth buffer as a result of the comparison, and iterating the operation of storing the depth value and the color value through the operation of substituting the depth value and the color value with respect to all the reference images. The depth test unit may further include a splat unit adaptively controlling a splat size depending on a distance from the predetermined view point to the 3D object, and the visualization unit may visualize the 3D object by using the depth data, the color data, and the appropriately sized splat. The splat unit may include: a splat size determining unit determining an initial splat size by comparing the resolution of the reference image with the resolution of a destination image; and an adaptive splat unit adjusting the initial splat size according to an enlargement/reduction ratio of a zoom-in/zoom-out operation to create the destination image.

According to still another aspect of the present invention, there is provided an apparatus for high speed visualization of depth image-based three-dimensional (3D) graphic data, wherein the apparatus includes: a point texture initialization unit reading point texture data of a 3D object; a warping order determining unit determining a warping order for drawing pixels of reference images of the point texture at a predetermined view point according to the position of an epipolar point and a sign of a depth coordinate value; a point texture splat unit adaptively controlling a splat size depending on a distance from a predetermined view point to a 3D object; and a visualization unit visualizing the 3D object by using the warping order and the appropriately sized splat.

The point texture initialization unit may transform 3D object data represented by an octree structure to the point texture data. The point texture initialization unit may include: an octree decoding unit decoding the 3D object data represented by an octree structure; a depth value computation unit projecting voxels of the octree on a predetermined pixel position of a reference surface in a normal direction with respect to the reference surface corresponding to a predetermined surface of a hexahedron including the decoded octree, and defining distances from the voxels to pixels corresponding to the voxels projected on the reference surface as depth values; and a color value creating unit defining colors of the voxels as color values. The reference images of the warping order determining unit may have depth and color data except for background data around a predetermined size of square including an object. The warping order determining unit may further include a coordinate transformation unit for transforming each coordinate value of the reference coordinate system in which the point texture has been defined to an eye coordinate system. The warping order may include: horizontal and vertical warping orders for the pixels of the reference images toward the projected epipolar point; and a depth-axial (z-axis) warping order for the pixels of the reference images, in a back-to-front direction if a depth-axial coordinate value of the epipolar point is positive, or in a front-to-back direction if the depth-axial coordinate value of the epipolar point is negative.

According to still another aspect of the present invention, there is provided a computer readable recording medium storing a program for implementing embodiments of the present invention in a computer.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 22 shows an example of visualization for various models represented by a simple texture in a personal information terminal, according to an embodiment of the present invention; and FIG. 23 shows rendering speeds of the point texture and the octree image shown in FIGS. 20 and 21, respectively, according to an embodiment of the present invention.

DETAILED DESCRIPTION OF THE PREFERRED EMBODIMENTS

Figure 1:
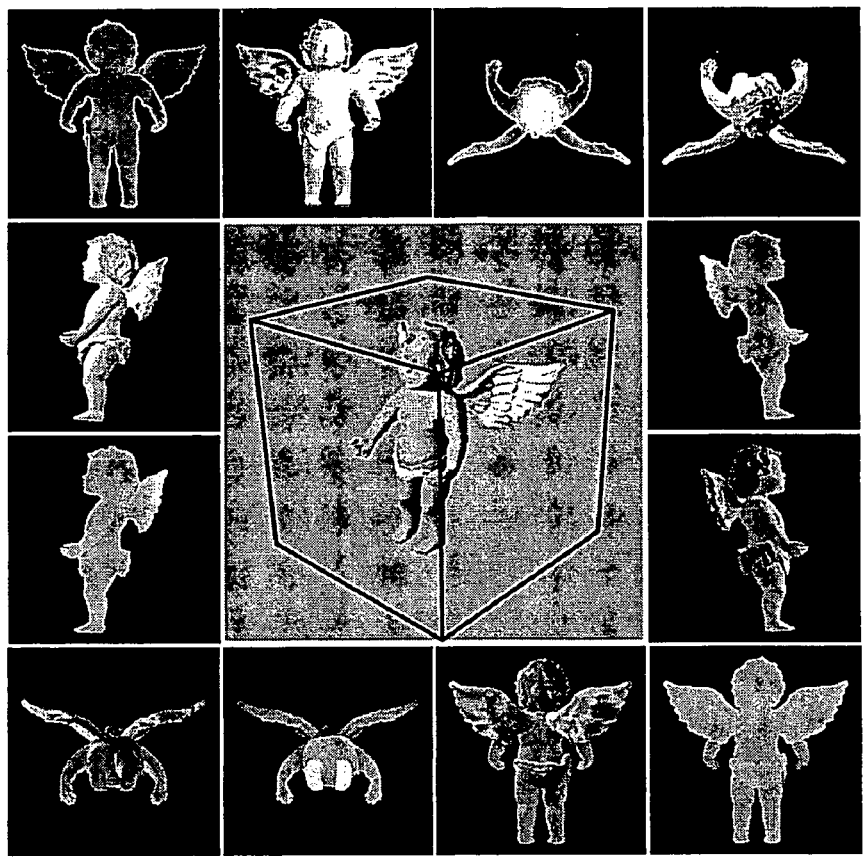
FIG. 1 shows a result of visualization of a simple texture-based model.
Figure 2:
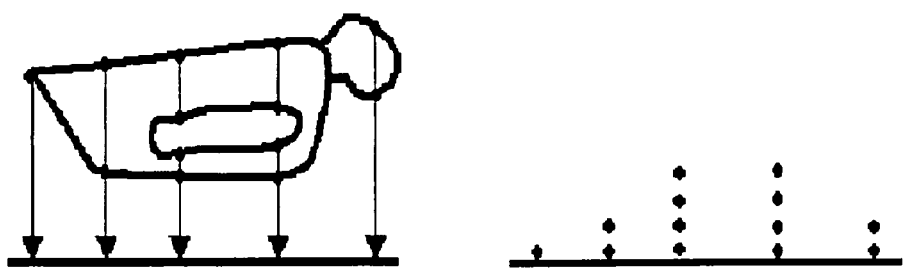
FIG. 2 shows an example of a point texture illustrated in one dimension.
Figure 3A:
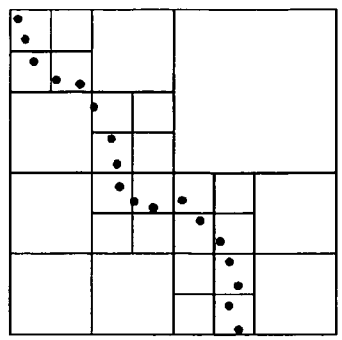
FIGS. 3A and 3B show examples of an octree image illustrated in a quatree structure.
Figure 3B:
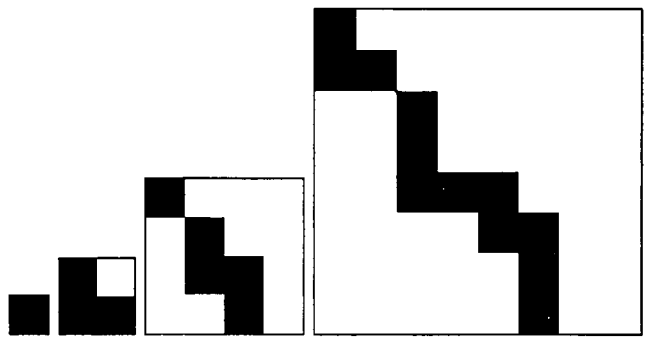
Figure 4:
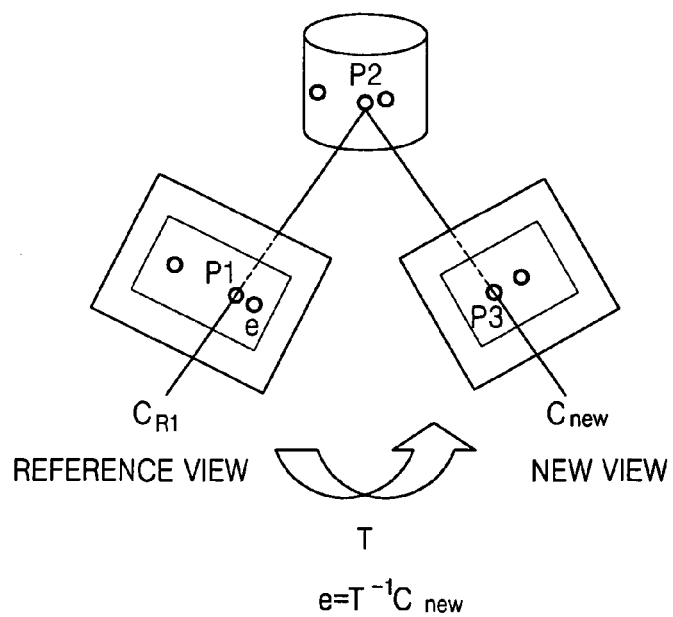
FIG. 4 shows an example of a search for an epipolar point.
Figure 5:
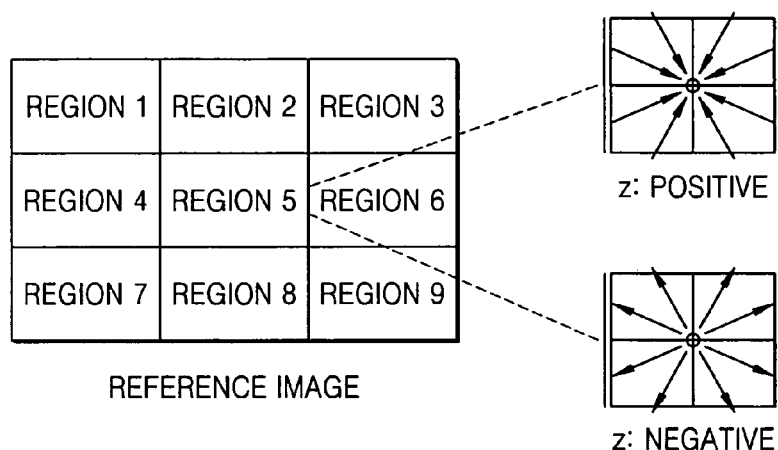
FIG. 5 shows nine regions, where an epipolar point probably exists, and shows that a pixel visiting order of a reference pixel changes depending on a sign on a z-axis when the epipolar point exists in a region 5.

Reference will now be made in detail to the embodiments of the present invention, examples of which are illustrated in the accompanying drawings, wherein like reference numerals refer to the like elements throughout. The embodiments are described below to explain the present invention by referring to the figures.

Embodiments of the present invention may, however, also be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will not be repeated.

Now, a method and/or an apparatus for high speed visualization of a depth image-based 3D graphic data, according to embodiments of the present invention, will be described with reference to the attached drawings. The matters of the present invention can be classified into simple texture visualization, point texture visualization, and octree image visualization. The simple texture visualization, the point texture visualization, and the octree image visualization commonly are high speed visualization using fixed-point arithmetic operation, adaptive splatting, and techniques of removing background data in a reference image.

Figure 6:
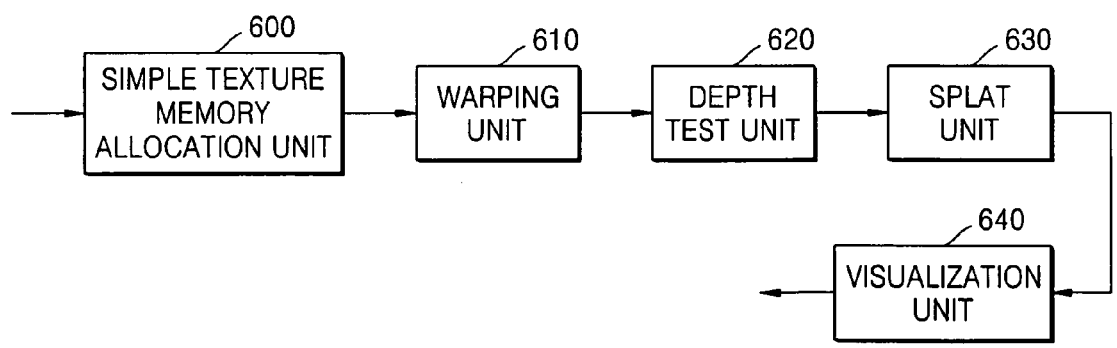
FIG. 6 shows a block diagram of an apparatus for high speed visualization of depth image-based 3D graphic data, according to an embodiment of the present invention.

First, the simple texture visualization will be described. FIG. 6 shows a block diagram of an apparatus for high speed visualization of depth image-based 3D graphic data according to an embodiment of the present invention. The block diagram of the apparatus includes a simple texture memory allocation unit 600, a warping unit 610, a depth test unit 620, a splat unit 630, and a visualization unit 640.

The simple texture data memory allocation unit 600 allocates memory to simple texture data containing a plurality of reference images.

Figure 7:
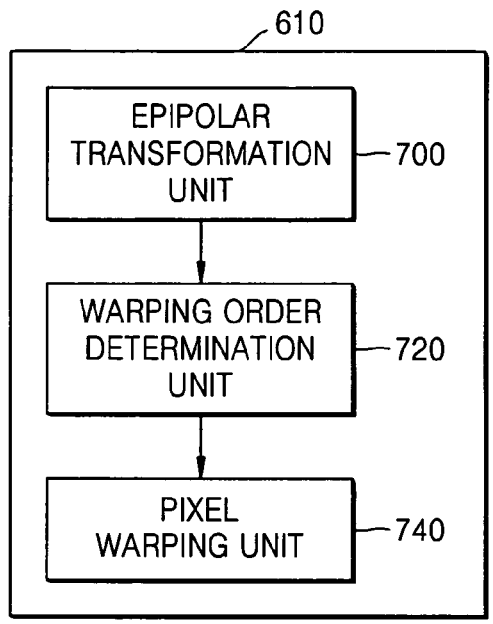
FIG. 7 shows a block diagram of a warping unit, according to an embodiment of the present invention.

The warping unit 610 performs a 3D warping with respect to simple texture reference images of the simple texture data memory allocation unit 600 to create a plurality of warping images. As shown in FIG. 7, the warping unit 610 includes an epipolar transformation unit 700, a warping order determining unit 720, and a pixel warping unit 740.

The epipolar transformation unit 700 searches an epipolar point by projecting a center of an eye coordinate system at a predetermined view point on the reference image. The warping order determining unit 720 determines a warping order of pixels of the reference image depending on which of the nine regions defined in the reference image the epipolar point is projected on. The pixel warping unit 740 transforms each coordinate value of the reference coordinate system in which the simple texture has been defined to appropriate values of the eye coordinate system according to the warping order and generates a warped image.

Figure 8:
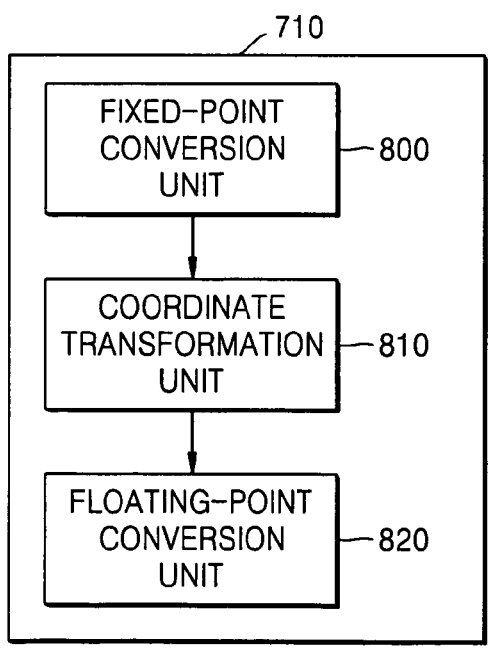
FIG. 8 shows a block diagram of a coordination transformation unit, according to an embodiment of the present invention.

An operation in the warping unit 610 is accomplished by an operation unit including a fixed-point conversion unit 800, a coordinate transformation unit 810, and a floating-point conversion unit 820 as shown in FIG. 8. The fixed-point conversion unit 800 converts a floating-point representation into the corresponding fixed-point representation. The coordinate transformation unit 810 performs a coordinate transformation by using fixed-point number obtained from the fixed-point conversion unit 800. The floating-point conversion unit 820 converts the result of the arithmetic operation in the coordinate transformation unit 810 to a floating-point representation.

Figure 9:
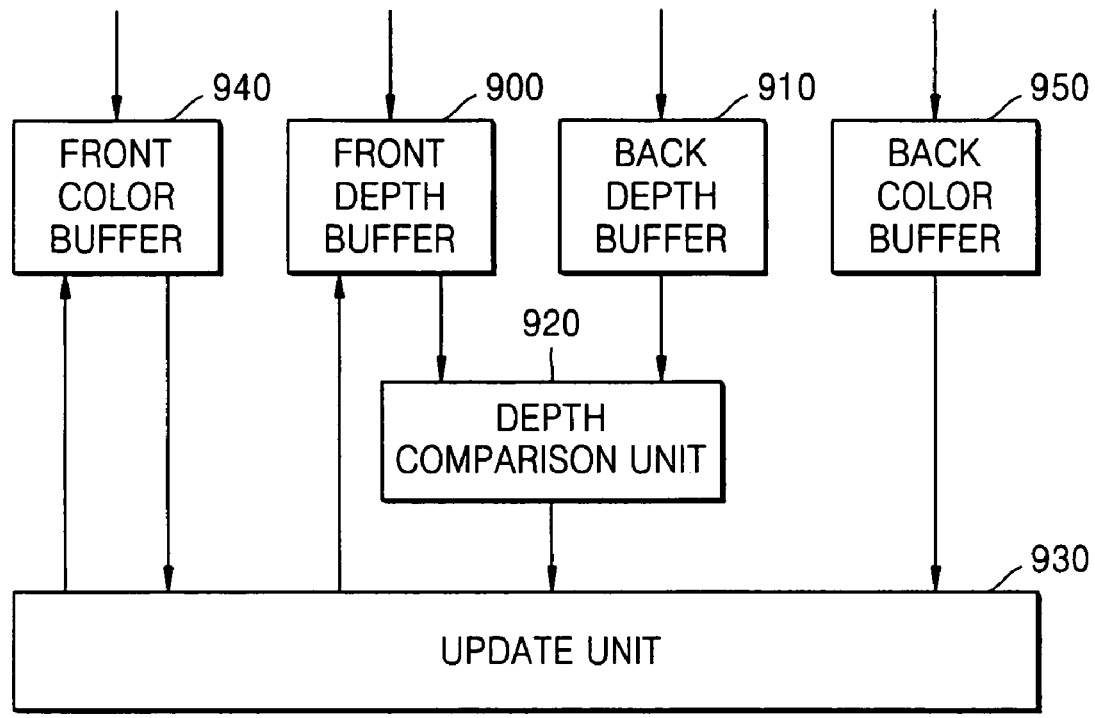
FIG. 9 shows a block diagram of a depth test unit, according to an embodiment of the present invention.

The depth test unit 620 performs a depth test with respect to each pixel of a plurality of warping images created by the warping unit 610 to obtain final color data. FIG. 9 shows a block diagram of the depth test unit 620. The depth test unit 620 includes a front depth buffer 900, a back depth buffer 910, a depth comparison unit 920, an update unit 930, a front color buffer 940, and a back color buffer 950.

The front depth buffer 900 stores a depth value formed by a warping of the first reference image. The front color buffer 940 stores a color value formed by performing a warping with respect to the first reference image. The back depth buffer 910 stores a depth value formed by a warping of the second reference image. The back color buffer 950 stores a color value formed by a warping of the second reference image. The depth comparison unit 920 compares the depth value stored in the front depth buffer 900 with the depth value stored in the back depth buffer 910. If the value stored in the front depth buffer 900 is smaller than or equal to the value stored in the back depth buffer 910 as a result of the comparison, the update unit 930 remains the value as it is. However, if the value stored in the front depth buffer 900 is larger than the value stored in the back depth buffer 910, the update unit 930 substitutes the values stored in the front depth buffer 900 and the front color buffer 940 with the values stored in the back depth buffer 910 and the back color buffer 950, respectively. The procedure is iteratively performed for all reference images.

Figure 10:
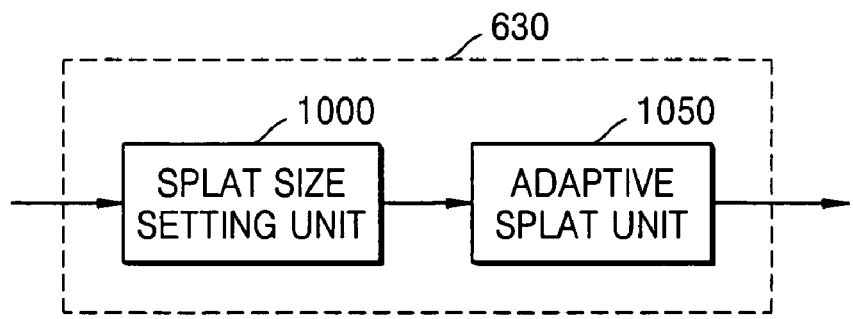
FIG. 10 shows a block diagram of a splat unit, according to an embodiment of the present invention.

The splat unit 630 adaptively controls a splat size depending on a distance from a predetermined view point to a 3D object. The splat unit 630 includes a splat size setting unit 1000 and an adaptive splat unit 1050 as shown in FIG. 10. The splat size setting unit 1000 determines an initial splat size by comparing a resolution of the reference image with a resolution of a destination image. The adaptive splat unit 1050 adjusts the initial splat size depending on an enlargement/reduction ratio of a zoom-in/zoom-out operation to create a destination image.

The visualization unit 640 visualizes a 3D object by using the depth data, the color data, and the appropriately sized splat.

Figure 11:
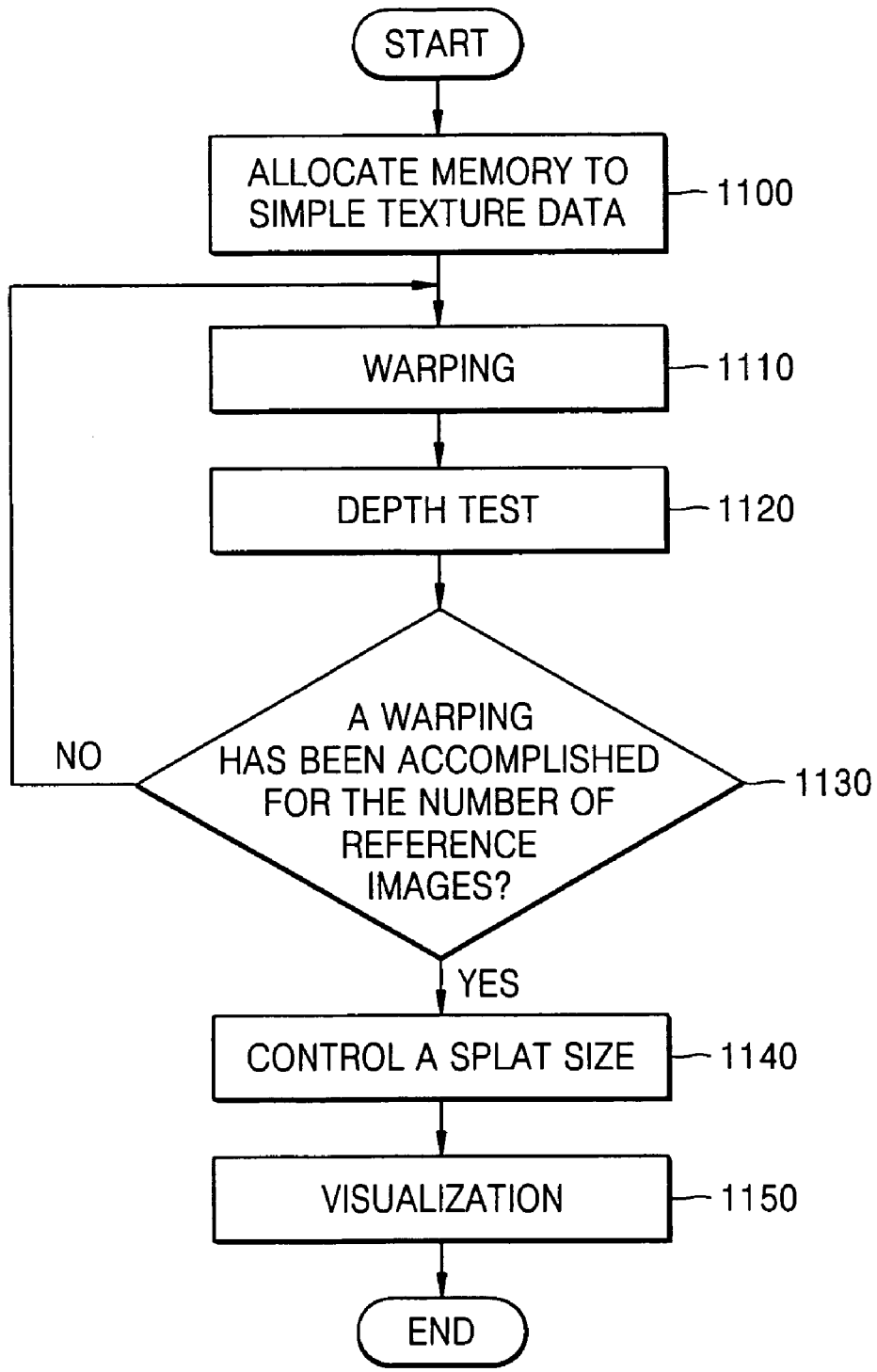
FIG. 11 shows a flow chart of an operation in an apparatus for high speed visualization of simple texture data of the depth image-based 3D graphic data, according to an embodiment of the present invention.

FIG. 11 shows a flow chart of an operation in an apparatus for high speed visualization of simple texture data of the depth image-based 3D graphic data. Now, the operation in an apparatus for high speed visualization of simple texture data will be described with reference to FIG. 11.

The warping is an image processing technique for transforming a reference image represented by using a reference view point to a reference image represented by using other different view point.

The conventional McMillan's 3D warping algorithm is the method of producing 3D object data visualized in a new view from only one reference image. The simple texture of the present invention uses N reference images in order to represent 3D object data. Therefore, the McMillan's 3D warping algorithm cannot be directly applied. The present invention proposes the method of producing 3D object data and creating target image by performing a warping from N reference images. The reference image is represented by a color-image/depth-image pair. Therefore, the simple texture memory allocation unit 600 allocates memory to simple texture data (operation 1100).

Then, the warping unit 610 performs the warping to create a warped image (operation 1110). More specifically, if the warping is performed for one reference image, an image having corresponding depth information and corresponding color information is created. Needless to say, in this case, the depth test according to a McMillan's algorithm is not performed. Instead, the information is always recorded on the depth buffer and the color buffer.

The warping is iterated to N images by using the McMillan's algorithm. In this case, the depth values of each of the N images are determined by the warping. However, a depth relation caused by the warping among the N reference images cannot be identified. Therefore, the depth test unit 620 performs a depth test in order to determine the depth relation among the reference images (operation 1120). Thus, pixels of the finally visualized 3D object data have color values corresponding to the closest depth data to the view point among depth data formed by warping N reference images.

Now, how to determine which of the N depth values is closest to the view point will be described. First, depth and color values formed by performing a warping of the first reference image are stored in the front depth buffer 900 and the front color buffer 940, respectively. Similarly, results of the warping of the second reference image are stored in the back depth buffer 910 and the back color buffer, respectively. Then, the depth comparison unit 920 compares depth values stored in the back depth buffer 910 and the front depth buffer 900 with each other. If the depth value stored in the back depth buffer 910 is smaller than that stored in the front depth buffer 900, the update unit 930 substitutes a color value of a pixel position corresponding to the front color buffer 940 with a color value of a pixel position corresponding to the back color buffer 950. If the depth value of the back depth buffer is larger than or equal to that of the front depth buffer, the color values of the color buffers are not changed. When this procedure is iterated from the second reference image to the Nth reference image, only a surface viewing from the view point can be always displayed.

Meanwhile, in order to reduce a computation load for the above procedure, the following procedure is applied. In the above procedure, the warping has been applied to all the N reference images. However, in this procedure, if an angle between a predetermined view vector created by user's interaction and a normal vector of the reference image is larger than a predetermined angle, the corresponding reference image is not subjected to the warping. For example, if a predetermined view vector and a normal vector of the reference image are perfectly opposite each other, that is, the predetermined angle is 180 degree, the warping is not accomplished for the perfectly opposite reference images. By doing such a method, it is possible to reduce a computation load and to improve a visualization speed.

Now, let us see how much the above warping method can reduce the number of depth tests in comparison with the conventional method that uses the depth buffers, supposing that the resolution of the reference image is $I_R*J_R$, the resolution of the new viewing image is $I_N*J_N$, and a half of the reference image area is filled with not a background but an object.

According to the conventional method that the depth buffers are used, the number of pixels becomes $1/2*I_R*J_R$, and the depth test is performed for each of the above number of pixels. In addition, the depth test has to be applied to N reference images. Finally, $N*1/2*I_R*J_R$ depth tests are accomplished. However, if the warping method according to the present invention is applied, the number of pixels constituting one viewing image becomes $I_N*J_N$, so that $(N-1)*1/2*(I_N*J_N)$ depth tests are accomplished for N reference images.

Typically, since the resolution of an image is much larger than N, the number of depth tests can be approximated to $(I_R*J_R)$ and $(I_N*J_N)$. Therefore, the number of depth tests of the warping method according to the present invention is constant. Accordingly, as the resolution of the reference image is getting larger than the resolution of the new viewing image, the number of depth tests is correspondingly getting smaller.

Figure 16:
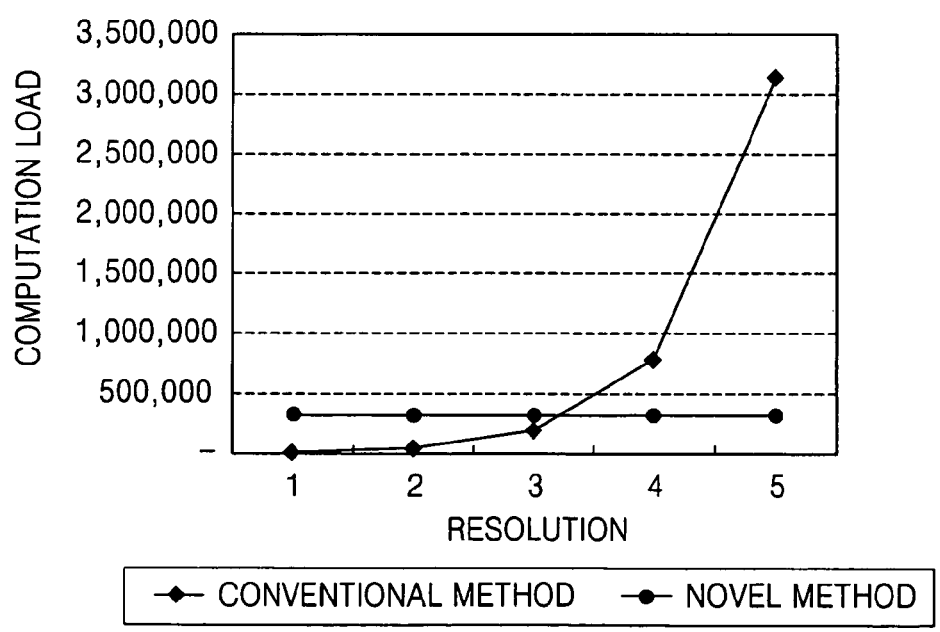
FIG. 16 shows a graph comparing a conventional method with method of the present invention when a destination resolution of a simple texture is constant.

FIG. 16 shows a graph illustrating the number of depth tests assuming that N=6, $I_R=J_R$, and $I_N=J_N$. As shown in the graph of FIG. 16, the method according to the present invention is dependent on the resolution of a destination image regardless of the resolution of an input (reference) image. However, since view point changes such as zoom-in/zoom-out frequently occur when a 3D object is visualized in most of 3D applications, the 3D objects or the scenes should be visualized as precise as possible, so that high resolution input images are necessary. Therefore, the method according to the present invention can provide a high quality rendering with a smaller computation load than the conventional method that subjects the high resolution input images to the depth test.

Typically, floating-point arithmetic operation produces more accurate results than fixed-point arithmetic operation, but requires several ten times of a central processing unit (CPU) clock frequency of fixed-point arithmetic operation. Particularly, a CPU adopted in a mobile terminal such as a personal digital assistant (PDA) or a mobile phone does not support the floating-point arithmetic operation. However, since most operations necessary for a 3D graphic visualization requires floating-point arithmetic operation, high speed visualization is difficult to be achieved in such an environment. Therefore, in order to achieve high speed visualization by using an image-based model in a variety of environments including mobile terminals, the floating-point arithmetic operation in the main part of the visualization algorithm is transformed to the fixed-point arithmetic operation to implement integer arithmetic operation, so that the visualization speed can be improved.

During the fixed-point arithmetic operation composed of fixed-point addition and multiplication, it is necessary to avoid overflows. Therefore, the fixed-point data format should be carefully designed, considering the number of simultaneous additions and multiplications as well as the required precision. Now, a worst-case analysis of a bit allocation method for this purpose will be described.

Typical affine transformation in 3-D geometry pipeline has the following format.

Equation 1

$$\begin{pmatrix} Y_1 \\ Y_2 \\ Y_3 \end{pmatrix} = \begin{pmatrix} r_{1,1} & r_{1,2} & r_{1,3} \\ r_{2,1} & r_{2,2} & r_{2,3} \\ r_{3,1} & r_{3,2} & r_{3,3} \end{pmatrix} \begin{pmatrix} X_1 \\ X_2 \\ X_3 \end{pmatrix} + \begin{pmatrix} t_1 \\ t_2 \\ t_3 \end{pmatrix}$$

$$\Leftrightarrow Y = RX + T$$

In the method according to the present invention, the R matrix represents only rotation (without scaling) and T vector denotes translation. Since R means rotation and we normalize the object inside the unit cubic view volume, the values of each element of R and T are all between −1 and 1.

Suppose that M.N format is used for the fixed-point numbers. Since the absolute value of the operand is less than 1, 0 bits are allocated to the integer part, i.e. 1.N format is used. Now, let's find the maximum value of N. If two values having such a format are multiplied and stored, 2N bits (except the sign bit) are necessary to avoid the overflow. Similarly, if two values are added and stored, N+1 bits are necessary.

In the 3-D affine transformation represented in (Equation 1), the number of multiplications between the operands is mostly limited to two times. On the other hand, the number of simultaneous additions becomes 3. In this case, the memory space to store the result is 2N+3 bits. If we consider the additional sign bit, we need 2(N+2) bits.

Since the whole result should be represented by the integer format, this 2(N+2) should be less than the number of bits in the integer format. In the method according to the present invention, 32 bits integer is used. Therefore, the maximum of N, i.e. $N_{Max}$, is 14. In this case, the precision is $2^{-14} (\cong 6 \times 10^{-5})$ which is sufficiently small.

Before affine transformation, each coordinate value is multiplied by $2^{N_{Max}}$ to be converted into the fixed-point number in the fixed-point conversion unit 800. Then, the coordinate transformation is performed to achieve the 3-D warping, using the fixed-point arithmetic operation in the coordinate transformation unit 810. As described above, the overflow does not occur in this case. After 3-D warping, the final coordinate value is obtained by converting the integer result back to the floating-point number by dividing $2^{N_{Max}}$ in the floating-point conversion unit 820.

The part to which the fixed-point arithmetic operation is applied is the warping unit 610 where reference coordinates in the reference coordinates system in which the simple texture has been defined is transformed to the eye coordinates system during the visualization process.

Meanwhile, according to an aspect of the present invention, the adaptive determination method of splat size is used. The depth test is performed (operation 1120), and then it is examined whether or not the warping and the depth test are accomplished for all the reference images (operation 1130). If the warping and the depth test have been accomplished for all the reference images, the splat size is adjusted according to the present invention (operation 1140). And the visualization can be directly performed (operation 1150). The conventional method uses a triangle as a primitive for visualization but the image-based visualization method uses splatting a point in a 3D space on an image for visualization. And the 3D point as splat has a certain shape and a certain size. When user frequently changes the view point, if an equal size of splat is used, a "hole" phenomenon is generated during the zoom-in, and a coarse low quality visualization is performed during the zoom-out. In order to compensate for this, it is probable that an optimal splat size is calculated by using density of points in an initial 3D image model, a distance from the view point to the model, and an angle between viewlines. Unfortunately, this requires very complicated computation, thereby not being appropriate for the high speed visualization.

Therefore, an aspect of the present invention proposes a method of implementing an adaptive splat size for the zoom-in/zoom-out with a small amount of computation loads by using properties of an orthographic projection. The method according to the present invention can be divided into two procedures. As the first procedure, the splat size setting unit 1000 compares the resolution of the reference image with a resolution of the destination image to determine an initial splat size. As a second procedure, the adaptive splat unit 1050 adjusts the initial splat size depending on the enlargement/reduction ratio during the zoom-in/zoom-out to create the destination image.

More specifically, the first procedure is to create an initial view having no "hole" phenomenon. If the resolution of the destination image is smaller than or equal to the resolution of the reference image, the initial splat size is set to one. If the resolution of the destination image is larger than the resolution of the reference image, the splat size is set to the average enlargement aspect ratio while the initial view is created. Thus, the created initial view does not have any "hole" phenomenon.

Subsequently, in the second procedure, properties of the orthographic projection are used. That is, in the perspective projection, a ratio according that the view point is getting close to or going away from an object is different from an enlargement/reduction ratio of an object projected to the destination image. However, in the orthographic image, both ratios are equal. Therefore, the zoom-in/zoom-out can be implemented by enlarging/reducing coordinates in the projected image according to zoom-in/zoom-out ratio. In addition, implementation of these procedures can be obtained by enlarging/reducing the 3D coordinates of an object in only one time according to that ratio. According to the present invention, the splat size is enlarged/reduced by using that ratio. Therefore, it is possible to prevent the "hole" phenomenon during the zoom-in and to avoid the coarse low quality visualization during the zoom-out in an adaptive manner.

Figure 17:
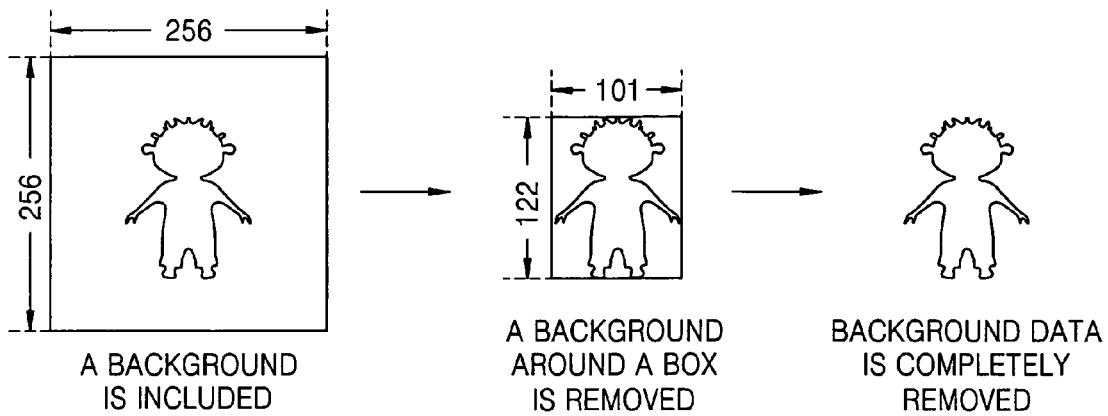
FIG. 17 shows a method of removing background data, according to an embodiment of the present invention.

Meanwhile, according to the present invention, techniques for eliminating background data from the reference image are used in order to increase a visualization speed. Typically, only a part of the reference image is used as object data, and the remaining part is used as a background, the meaningless part. This is specifically illustrated in FIG. 17. According to the present invention, the background data is removed during the memory allocation for the 3D warping and the warping regarded as it is. Therefore, it is possible to reduce memory usage and to improve a visualization speed.

Before the reference image is stored, the background data around a minimum size of square including the object is removed, so that the memory usage is reduced and the visualization speed is improved. Moreover, during storing the reference image, the background data within the minimum size of square is removed except for the object, so that the memory usage is further reduced and the visualization speed is further improved.

Figure 12:
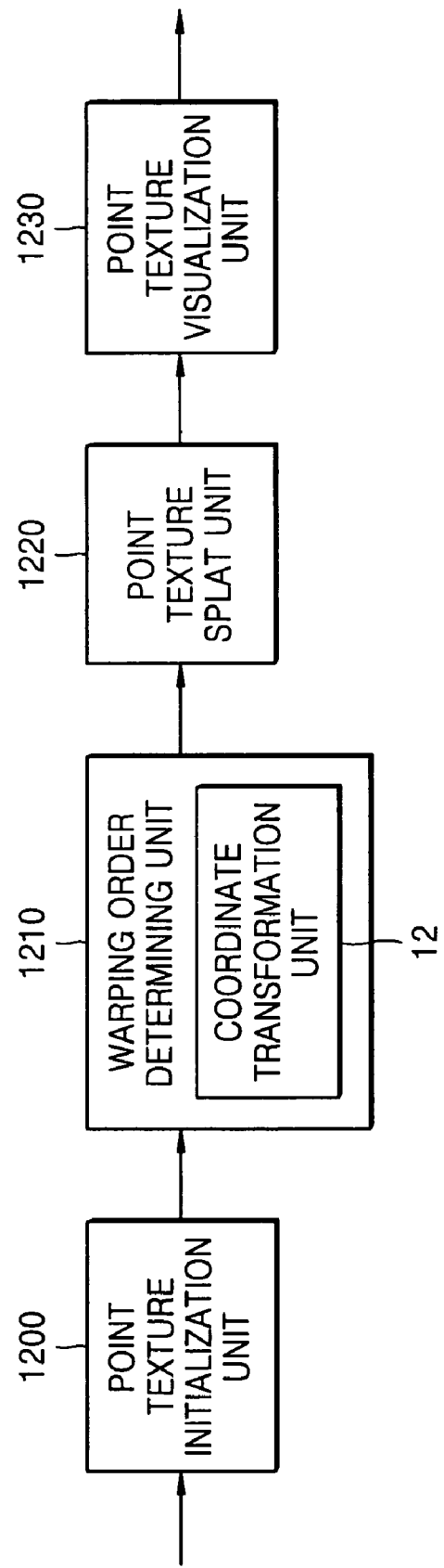
FIG. 12 shows a block diagram of an apparatus for high speed visualization of point texture data of the depth image-based 3D graphic data, according to an embodiment of the present invention.

Now, point texture visualization will be described. FIG. 12 shows a block diagram of an apparatus for high speed visualization of point texture data of the depth image-based 3D graphic data according to an embodiment of the present invention. The apparatus for high speed visualization of point texture data includes a point texture initialization unit 1200, a warping order determining unit 1210, a point texture splat unit 1220, and a point texture visualization unit 1230.

The point texture initialization unit 1200 creates a 3D object into point texture data format.

Figure 14:
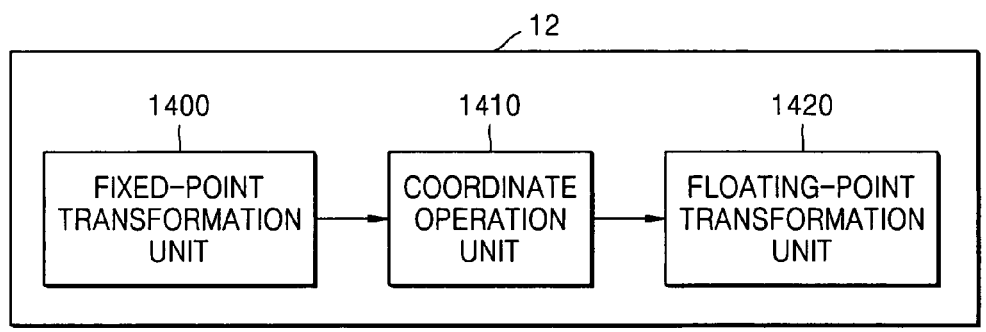
FIG. 14 shows a block diagram of a coordinate transformation unit of an apparatus for high speed visualization of point texture data, according to an embodiment of the present invention.

The warping order determining unit 1210 determines a warping order of drawing pixels according to the position of the epipolar point and the sign of a depth coordinate value at a predetermined view point with respect to the reference image of the point texture. However, since properties of the orthographic projection should be considered unlike the McMillan's warping method, the warping order does not vary depending on the sign of the depth coordinate value of the epipolar point. The reference image does not include the background data outside the minimum size of square including an object. Preferably, the warping order determining unit 1210 further includes a coordinate transformation unit 12. The coordinate transformation unit 12 transforms the reference coordinate system in which the point texture has been defined into an eye coordinate system when the view point changes. As shown in FIG. 14, the coordinate transformation unit 12 includes a fixed-point conversion unit 1400 for converting a floating-point number into fixed-point number, a coordinate transformation unit 1410 for performing coordinate transformation by using the converted fixed-point number, and a floating-point conversion unit 1420 for converting the result of the coordinate transformation into a floating-point representation.

The point texture splat unit 1220 adaptively controls the splat size depending on the distance from the predetermined view point to the 3D object. The point texture splat unit 1220 has a similar function and construction to the splat unit 630 described above regarding the simple texture.

The point texture visualization unit 1230 performs the visualization of a 3D object by using the warping order and the appropriately sized splat.

Figure 13:
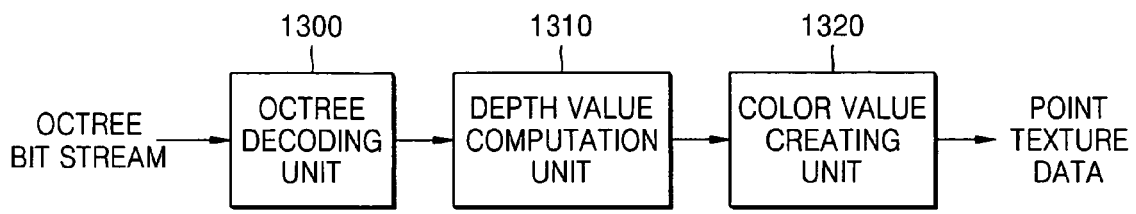
FIG. 13 shows a block diagram for octree data in a point texture initialization unit for transforming a 3D object data represented by an octree structure to point texture data, according to an embodiment of the present invention.

Meanwhile, the point texture initialization unit 1200 may have two selectable routines, one of which transform 3D object data having an octree construction to point texture data and the other of which confirm point texture data itself, in which the point texture isn't transformed. FIG. 13 shows a block diagram for octree data in a point texture initialization unit 1200 for transforming 3D object data to point texture data, which is reorganized for the octree construction. The transformation part for octree data in point texture initialization unit 1200 includes an octree decoding unit 1300, a depth value computation unit 1310, and a color value creating unit 1320.

The octree decoding unit 1300 decodes the 3D object data represented by an octree construction. In the depth value computation unit 1310, a predetermined surface of a hexahedron including the decoded octree is defined as a reference surface, and then voxels of the octree are projected on specific pixel positions of the reference surface in a normal direction, so that the distances from the voxels to the a pixel associated with the projected voxel on the reference surface are defined as the depth value. The color value creating unit 1320 creates color values of the voxels.

Figure 15:
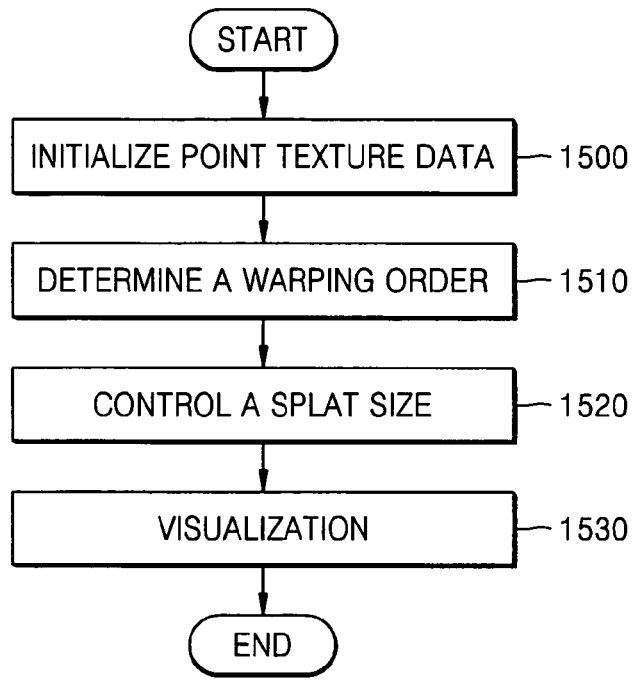
FIG. 15 shows a flow chart of an operation in an apparatus for high speed visualization of point texture data of the depth image-based 3D graphic data, according to an embodiment of the present invention.

FIG. 15 is a flow chart illustrating an operation of an apparatus for high speed visualization of point texture data of the depth image-based 3D graphic data according to an embodiment of the present invention. Now, operation according to the present invention will be described.

In order to visualize a 3D graphics object in a high speed, a data structure capable of implementing it with a small amount of memory usage and computation loads is necessary. The conventional model represented by polygons has a slow visualization speed and requires an amount of memory usage, so that it is not appropriate for a method of displaying a high definition image such as a real picture in a mobile terminal. On the contrary, since the point texture has a grid type image structure and information on both the 3D coordinates and the surface of the object, it is possible to reorganize images at a new view point with a small amount of computation loads. In other words, since the complicated computation is not necessary unlike the polygonal model, the present invention can be effectively adopted to a mobile terminal having limited performance and capacity.

First, the point texture initialization unit 1200 creates point texture data of a 3D object (operation 1500). The reference image of the point texture has depth and color data except for the background data outside a minimum size of square region including an object.

The warping order determining unit 1210 determines a warping order of drawing pixels at a predetermined view point according to a position of an epipolar point with respect to the reference image of the point texture (operation 1510).

Then, the point texture splat unit 1220 adaptively controls the splat size depending on the distance from a predetermined view point to the 3D object (operation 1520). The adaptive control of the splat size is accomplished by determining an initial splat size according to the comparison between the resolution of the reference image and the resolution of the destination image and modifying the splat size depending on the enlargement/reduction ratio of the zoom-in/zoom-out to create the destination image.

If the resolution of the destination image is smaller than or equal to the resolution of the reference image, the size of the destination image is reduced according to the enlargement/reduction ratio, and the splat size is set to one. The splat size is enlarged by using the enlargement ratio during the zoom-in to prevent the "hole" phenomenon, and is reduced during the zoom-out to retain a predetermined level of visualization quality.

The 3D object visualization is accomplished by using the warping order determined by the point texture visualization unit 1230 and the appropriately sized splat (operation 1530). However, since the point texture visualization uses Shade's algorithm, the warping order follows a direction toward the epipolar point regardless of a sign of the depth coordinate value because of the properties of the orthographic projection unlike the McMillan's warping algorithm adopted by Shade.

Meanwhile, the point texture initialization unit 1200 may create octree-structured data as the point texture data. FIG. 13 shows a process of creating the octree-structured data.

More specifically, since the 3D voxel structure allows even an empty space including no object to have color values, and thus is not efficient. Typically, in order to implement a hierarchical data structure and reduce memory usage, a 3D octree voxel structure is adopted to binding voxels according to the octree structure. However, such a 3D octree voxel structure still has a large amount of data. Therefore, in order to visualize them in a high speed, it is necessary to optimize the memory usage and the computation load. Accordingly, if the octree voxel structure is transformed to the point texture, information on only the regions having data is stored, so that the amount of data can be reduced, and data management also can become convenient.

Figure 18:
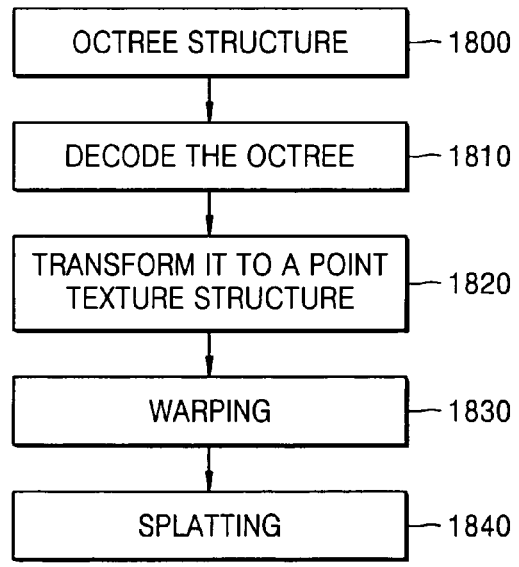
FIG. 18 shows a flow chart of a method of high speed visualization of an octree image, according to an embodiment of the present invention.

FIG. 18 is a flow chart illustrating a visualization order of an octree structure. First, the octree structure is received (operation 1800). Then, the octree data is decoded to find color values and position values (operation 1810). As a result, if a particular reference surface of the octree is regarded as an image, it is possible to identify the number of depth data necessary for a particular point. The number of necessary depth data finally corresponds to the number of layers of the particular point of the created point texture. Therefore, the memory allocation is accomplished for only the same number of layers, and the depth and color values are stored for the created point texture data structure (operation 1820).

Since, according to the octree image visualization, the warping (operation 1830) and the splatting (operation 1840) are accomplished by using the point texture visualization method as it is after the transformation to the point texture structure, it is possible to reduce the memory usage and improve the visualization speed.

Figures 19A, 19B, 19C:
FIGS. 19A-19C show examples of visualization for a BOO model represented by a simple texture in a personal information terminal, according to an embodiment of the present invention.

FIGS. 19A-19C show visualization results of a BOO image data represented by the simple texture. It is recognized that the "hole" phenomenon is prevented when the splat size is incremented during the zoom-in as shown in FIGS. 19A-19C. However, it is also recognized that an average visualization speed is reduced because one pixel of the reference image has to correspond to a plurality of pixels of the destination screen. This is well illustrated in FIG. 22, which shows quantitative visualization results for the simple texture-based model.

Figures 20A, 20B, 20C:
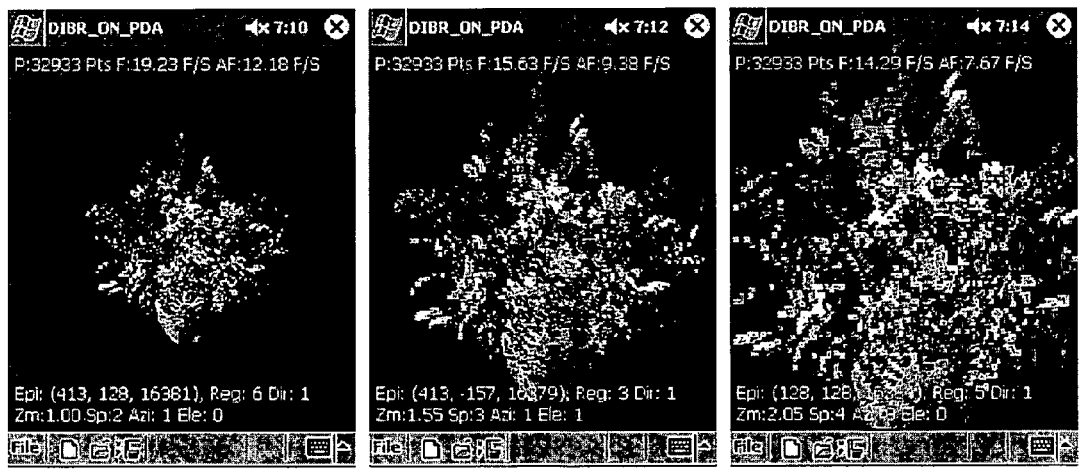
FIGS. 20A-20C show examples of visualization for a flower model represented by a point texture in a personal information terminal, according to an embodiment of the present invention.
Figure 21A:
FIGS. 21A-21B show examples of visualization for an angel model represented by an octree image in a personal information terminal, according to an embodiment of the present invention.
Figure 21B:

FIGS. 20A-20C show a result of the visualization of the flower image represented by the point texture data. In addition, FIG. 21A and 21B show a result of the visualization of an angel image represented by the octree data.

FIGS. 22 and 23 show quantitative results of the visualization of some image-based models. However the visualization speed somewhat varies depending on a model type and a splat size, and 500,000 points per a second can be processed for the point texture and the octree image. This corresponds to 1,000,000 triangles per a second for the conventional polygon-based visualization. This performance can not be obtained in mobile terminals until now by using the polygon-based visualization.

Embodiments of the invention can also be embodied as computer readable code on a medium, e.g., a computer readable recording medium. The medium may be any data storage/transferring apparatus that can store/transfer data, which can be thereafter read by a computer system. Examples of media include read-only memory (ROM), random-access memory (RAM), CD-ROMs, magnetic tapes, floppy disks, and optical data storage apparatuses, etc.

According to embodiments of the present invention, it is possible to reduce memory usage and increase the number of visualized images per a second because the 3D graphic object represented in an image-based manner is conveniently visualized. Particularly, the visualization of the 3D graphic object can be effectively accomplished when the present invention is applied to mobile terminals.

In addition, it is possible to increase a usage time limit if the present invention is applied to portable apparatuses because the memory usage and the power consumption for the memory access can be reduced. Furthermore, the visualization can be accomplished in a high speed even in a portable apparatus having limited central processing unit (CPU) performance and memory capacity, such as a personal digital assistant (PDA) or a mobile phone as well as a personal computer.

While embodiments of the present invention have been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of high speed visualization of depth image-based three-dimensional (3D) graphics data, the method comprising:

storing simple texture data comprising N reference images;

obtaining a plurality of warped images by performing a 3D warping of each of the reference images of the simple texture data at a predetermined view point;

obtaining depth data and color data by performing a depth test of each pixel comprising the plurality of warped images; and visualizing an object by using the depth data and the color data, wherein each of the N reference images corresponds to N different respective view points.

2. The method according to claim 1, wherein the plurality of reference images comprise the object data where background data is removed in a minimized area.

3. The method according to claim 1, wherein obtaining a plurality of warped images comprises:

searching an epipolar point by projecting a center of an eye coordinate system at a novel view point to the reference image of the simple texture data;

determining a warping order for the pixels of the reference images according to which of nine regions defined in the reference image corresponds to a region to which the epipolar point is projected;

obtaining the warped image by transforming each coordinate value of a reference coordinate system in which a simple texture has been defined according to the warping order to an eye coordinate system; and iterating from searching an epipolar point to obtain the warped image with respect to the reference images of the simple texture data.

4. The method according to claim 1, wherein the performing the 3D warping is accomplished by fixed-point arithmetic operation of a floating-point arithmetic operation, and wherein the fixed-point arithmetic operation comprises:

converting the floating-point number into the corresponding fixed-point number;

performing a coordinate transformation by using the converted the fixed-point number; and converting a result of the coordinate transformation into a floating-point representation.

5. The method according to claim 1, wherein the performing the depth test comprises:

storing depth and color values, obtained by the warping of the first reference image, in a front depth buffer and a front color buffer, respectively;

storing depth and color values, obtained by the warping of a second reference image, in a back depth buffer and a back color buffer, respectively;

comparing the depth value stored in the front depth buffer with the depth value stored in the back depth buffer;

substituting the depth value stored in the front depth buffer and the color value stored in the front color buffer with the depth value stored in the back depth buffer and the color value stored in the back color buffer, respectively, if the depth value stored in the front depth buffer is larger than the depth value stored in the back depth buffer as a result of the comparison; and iterating from the storing the depth and color values through the step of substituting the depth and color values with respect to all warped images.

6. The method according to claim 1, wherein the performing of the depth test further comprises adaptively controlling a splat size depending on a distance from a predetermined view point to a 3D object, and wherein the visualizing of the object is accomplished by using the depth data, the color data, and the appropriately adjusted sized splat.

7. The method according to claim 6, wherein the adaptively controlling of the splat size comprises:

determining an initial splat size by comparing the resolution of the reference image with a resolution of a destination image; and adjusting the initial splat size according to an enlargement/reduction ratio of a zoom-in/zoom-out operation to create the destination image.

8. The method according to claim 7, wherein the determining of the initial splat size comprises setting the splat size to 1 if the resolution of the destination image is smaller than or equal to the resolution of the reference image, and setting the splat size to an average enlargement aspect ratio if the resolution of the destination image is larger than the resolution of the reference image.

9. The method according to claim 7, wherein the adjusting of the initial splat size comprises enlarging the splat size by a zoom ratio so as to prevent a "hole" phenomenon during the zoom-in, and reducing the splat size by the zoom ratio so as to retain visualization quality of a predetermined level during the zoom-out.

10. A method of high speed visualization of depth image-based three-dimensional (3D) graphic data, the method comprising:

reading a point texture data of a 3D object;

determining a warping order for reference images of the point texture at a predetermined view point according to a direction from the predetermined view point toward the epipolar point based on properties of orthographic projection; and visualizing the 3D object by using the warping order.

11. The method according to claim 10, wherein the reading of the 3D object comprises transforming 3D object data represented by an octree structure to the point texture data and reading the transformed 3D object data.

12. The method according to claim 11, wherein the reading of the 3D object comprises:

decoding the 3D object data represented by an octree structure;

projecting voxels of the octree on a predetermined pixel position of a reference surface in a normal direction with respect to the reference surface corresponding to a predetermined surface of a hexahedron including the decoded octree;

defining the distance from the voxels to a pixel corresponding to the voxel projected on the reference surface as a depth value; and defining colors of the voxels as color values.

13. The method according to claim 10, wherein the determining of the warping order comprises:

determining horizontal and vertical warping orders for the pixels of the reference images toward the projected epipolar point; and determining a depth-axial (z-axis) warping order for the pixels of the reference images, in a back-to-front direction if a depth-axial coordinate value of the epipolar point is positive, or in a front-to-back direction if the depth-axial coordinate value of the epipolar point is negative.

14. The method according to claim 13, wherein the visualizing of the 3D object by using the warping order is accomplished by performing fixed-point arithmetic operation of a floating-point operation, and wherein the fixed-point arithmetic operation comprises:

converting the floating-point number into the corresponding fixed-point number;

performing a coordinate transformation by using the transformed fixed-point number; and converting the result of the coordinate transformation into a floating-point representation.

15. The method according to claim 10, wherein the determining of the warping order further comprises adaptively controlling a splat size depending on a distance from the predetermined view point to the 3D object, and wherein the 3D object is visualized by using the warping order and the appropriately sized splat.

16. The method according to claim 15, wherein the adaptively controlling of the splat size comprises:

determining an initial splat size by comparing the resolution of the reference image with a resolution of a destination image; and adjusting the initial splat size according to an enlargement/reduction ratio of a zoom-in/zoom-out operation to create the destination image.

17. The method according to claim 16, wherein the determining of the initial splat size comprises setting the splat size to 1 if the resolution of the destination image is smaller than or equal to the resolution of the reference image, or setting the splat size to an average enlargement aspect ratio if the resolution of the destination image is larger than the resolution of the reference image.

18. The method according to claim 16, wherein the adjusting of the initial splat size comprises enlarging the splat size by a zoom ratio so as to prevent a "hole" phenomenon during the zoom-in, and reducing the splat size by the zoom ratio so as to retain visualization quality of a predetermined level during the zoom-out.

19. An apparatus for high speed visualization of depth image-based three-dimensional (3D) graphics data, the apparatus comprising:

a simple texture data memory allocation unit allocating memory to simple texture data comprising N reference images;

a warping unit performing a 3D warping for each of the reference images of the simple texture of the simple texture data memory allocation unit at a predetermined view point;

a depth test unit performing a depth test for each pixel of the plurality of warping images to obtain depth and color data; and a visualization unit visualizing a 3D object by using the depth data and the color data obtained by performing the depth test, wherein each of the N reference images corresponds to N different respective view points.

20. The apparatus according to claim 19, wherein each of the reference images of the simple texture data comprises the object data removed background data around a minimum size of square.

21. The apparatus according to claim 19, wherein the warping unit comprises:
an epipolar transformation unit searching an epipolar point by projecting a center of an eye coordinate system at a predetermined view point to the reference images of the simple texture data;
a warping order determining unit determining a warping order for the pixels of the reference images according to which of nine regions defined in the reference images corresponds to a region to which the epipolar point is projected; and
a pixel warping unit transforming each coordinate value of a reference coordinate system, in which the simple texture has been defined according to the warping order, to an eye coordinate system to obtain the warping images.

22. The apparatus according to claim 19, wherein a floating-point representation is transformed to a fixed-point representation, a coordinate transformation is performed by using the fixed-point representation, and then the fixed-point representation is transformed to the floating-point representation.

23. The apparatus according to claim 19, wherein the depth test unit comprises:
a front depth buffer storing a depth value created by the warping for the first reference image;
a front color buffer storing a color value created by the warping for the first reference image;
a back depth buffer storing a depth value created by the warping for the second reference image;
a back color buffer storing a color value created by the warping for the second reference image;
a depth comparison unit comparing the depth value stored in the front depth buffer with the depth value stored in the back depth buffer; and
an update unit substituting the depth value stored in the front depth buffer and the color value stored in the front color buffer with the depth value stored in the back depth buffer and the color value stored in the back color buffer, respectively, if the depth value stored in the front depth buffer is larger than the depth value stored in the back depth buffer as a result of the comparison, and iterating from the storing the dept value and the color value through the substituting the depth value and the color value with respect to all the reference images.

24. The apparatus according to claim 19, wherein the depth test unit further comprises a splat unit adaptively controlling a splat size depending on a distance from the predetermined view point to the 3D object, and
wherein the visualization unit visualizes the 3D object by using the depth data, the color data, and the appropriately sized splat.

25. The apparatus according to claim 24, wherein the splat unit comprises:
a splat size determining unit determining an initial splat size by comparing a resolution of the reference image with a resolution of a destination image; and
an adaptive splat unit adjusting the initial splat size according to an enlargement/reduction ratio of a zoom-in/zoom-out operation to create the destination image.

26. An apparatus for high speed visualization of depth image-based three-dimensional (3D) graphic data, wherein the apparatus comprising:

a point texture initialization unit reading point texture data of a 3D object;
a warping order determining unit determining a warping order for drawing pixels for reference images of the point texture at a predetermined view point according to a direction from the predetermined view point toward epipolar point based on properties of orthographic projection;
a point texture splat unit adaptively controlling a splat size depending on a distance from a predetermined view point to a 3D object; and
a visualization unit visualizing the 3D object by using the warping order and the appropriately sized splat.

27. The apparatus according to claim 26, wherein the point texture initialization unit transforms 3D object data represented by an octree structure to the point texture data.

28. The apparatus according to claim 27, wherein the point texture initialization unit comprises:
an octree decoding unit decoding the 3D object data represented by an octree structure;
a depth value computation unit projecting voxels of the octree on a predetermined pixel position of a reference surface in a normal direction with respect to the reference surface corresponding to a predetermined surface of a hexahedron including the decoded octree, and defining distances from the voxels to pixels corresponding to the voxels projected on the reference surface as depth values; and
a color value creating unit defining colors of the voxels as color values.

29. The apparatus according to claim 26, wherein the warping order determined by the warping order determining unit includes:
horizontal and vertical warping orders for the pixels of the reference images toward the projected epipolar point; and
a depth-axial (z-axis) warping order for the pixels of the reference images, in a back-to-front direction if a depth-axial coordinate value of the epipolar point is positive, or in a front-to-back direction if the depth-axial coordinate value of the epipolar point is negative.

30. The apparatus according to claim 26, wherein a warping operation in the warping order determining unit is characterized in that a floating-point representation is converted into the corresponding fixed-point representation, a coordinate transformation is performed by using the fixed-point representation, and then the fixed-point representation is converted into the floating-point representation.

31. A medium comprising computer readable code implementing the method according to claim 1 in a computer.

32. A medium comprising computer readable code implementing the method according to claim 10 in a computer.

33. The method according to claim 2, wherein the minimized area is rectangular area surrounding the object.

34. The method according to claim 1, wherein the visualized object does not include background data.

35. A method of high speed visualization of depth image-based three-dimensional (3D) graphics data, the method comprising:
obtaining N warped images by performing a 3D warping of each of N reference images of a simple texture data at a predetermined view point;
performing a depth test of each pixel composing the plurality of warped images to obtain a depth data and a color data; and visualizing an object by using the depth data and the color data, wherein each of the N reference images corresponds to N different respective view points.

36. An apparatus for high speed visualization of depth image-based three-dimensional (3D) graphic data, wherein the apparatus comprising:

a warping order determining unit determining a warping order for drawing pixels for reference images of a point texture at a predetermined view point according to a direction from the predetermined viewpoint toward the epipolar point based on properties of orthographic projection;

a point texture splat unit adaptively controlling a splat size depending on a distance from a predetermined view point to a 3D object; and a visualization unit visualizing the 3D object by using the warping order and the appropriately sized splat.

* * * * *